(12) United States Patent
Denzler

(10) Patent No.: US 12,460,399 B2
(45) Date of Patent: Nov. 4, 2025

(54) SANITARY ARRANGEMENT

(71) Applicant: Neoperl GmbH, Müllheim (DE)

(72) Inventor: Oliver Denzler, Bottmingen (CH)

(73) Assignee: NEOPERL GMBH, Mullheim (DE)

( * ) Notice: Subject to any disclaimer, the term of this patent is extended or adjusted under 35 U.S.C. 154(b) by 723 days.

(21) Appl. No.: 17/854,123

(22) Filed: Jun. 30, 2022

(65) Prior Publication Data

US 2023/0009900 A1   Jan. 12, 2023

(30) Foreign Application Priority Data

Jul. 7, 2021   (DE) .......................... 202021103647.8

(51) Int. Cl.
*E03C 1/04* (2006.01)
*E03C 1/02* (2006.01)

(52) U.S. Cl.
CPC ...... *E03C 1/0408* (2013.01); *E03C 2001/026* (2013.01)

(58) Field of Classification Search
CPC .................... E03C 1/0408; E03C 2001/026
USPC ................................................ 4/567
See application file for complete search history.

(56) References Cited

U.S. PATENT DOCUMENTS

| | | | |
|---|---|---|---|
| 1,112,261 A | | 9/1914 | Carter |
| 3,192,939 A | * | 7/1965 | Moen ................. G05D 23/1313 137/625.41 |
| 3,471,872 A | * | 10/1969 | Symmons ............. E03C 1/0408 4/570 |
| 4,095,610 A | * | 6/1978 | Priesmeyer ............ F16K 19/00 137/119.03 |
| 4,752,975 A | * | 6/1988 | Yates ........................ E03C 1/06 239/443 |
| 8,683,624 B1 | * | 4/2014 | Zhadanov ............... E03C 1/025 4/615 |
| 2009/0000022 A1 | | 1/2009 | Phipps |
| 2011/0214766 A1 | * | 9/2011 | Hsieh .................... E03C 1/0408 137/625 |
| 2020/0378507 A1 | * | 12/2020 | Jones ........................ E03C 1/02 |
| 2022/0049784 A1 | * | 2/2022 | Li .......................... F16K 19/006 |
| 2023/0400119 A1 | * | 12/2023 | Zheng .................... F16K 19/006 |

FOREIGN PATENT DOCUMENTS

| | | |
|---|---|---|
| DE | 20115533 | 2/2002 |
| DE | 20315306 U1 | 3/2005 |
| DE | 102010018671 A1 | 11/2011 |
| DE | 102017105200 | 9/2018 |
| EP | 0363657 A2 | 4/1990 |
| JP | H09253633 | 9/1997 |

\* cited by examiner

*Primary Examiner* — Huyen D Le
(74) *Attorney, Agent, or Firm* — Volpe Koenig

(57) ABSTRACT

A sanitary arrangement (1) is provided having at least two diverters (2, 3). Each diverter has a water inlet (4) and at least two water outlets (5, 6). The first water outlet (5) of the first diverter (2) is fluidically connected to the water inlet (4) of the second diverter (3) and at least one water outlet of the second diverter (3) has a releasable interface (8) for the fluidic connection to a water dispensing device (9).

16 Claims, 2 Drawing Sheets

SANITARY ARRANGEMENT

INCORPORATION BY REFERENCE

The following documents are incorporated herein by reference as if fully set forth: German Patent Application No. 20 2021 103 647.8, filed Jul. 7, 2021.

TECHNICAL FIELD

The invention relates to a sanitary arrangement.

BACKGROUND

In a sanitary arrangement, for example, a shower device, it is possible to switch between a hand spray and an overhead spray. A user, for example a hotel guest, who is not familiar with a specific installation and who uses the shower device of a hotel bedroom for the first time, may be unsure through which water outlet the water flows when opening the fitting.

SUMMARY

The object of the invention is to develop a sanitary arrangement.

This object is achieved by a sanitary arrangement having one or more of the features disclosed herein.

Accordingly, the sanitary arrangement according to the invention has, in particular, at least two diverters, wherein each diverter has a water inlet and at least two water outlets, wherein the first water outlet of the first diverter is fluidically connected to the water inlet of the second diverter and at least one water outlet of the second diverter has a releasable interface for the fluidic connection to a water dispensing device.

In this manner, it is possible to implement a series switching of diverters, wherein it is possible to change over between different water outlets.

Any commercially available water dispensing device, for example a hand spray, may be connected to the sanitary arrangement and used by means of the releasable interface.

In one embodiment, the second water outlet of the first diverter is a safety outlet.

In this manner, it is possible to avoid scalding or other unpleasant experiences as a result of heat. To this end, the safety outlet may be arranged or oriented such that a person generally does not linger directly in the area of the jet of water from the safety outlet.

In an alternative embodiment, the second water outlet of the first diverter has a releasable interface for the fluidic connection to a safety outlet.

The safety outlet may be, for example, a bath tub fitting, a toe tester or a shower spray. In this manner it is possible to test the temperature of the water easily and safely.

In one embodiment, a diverter may be a monostable or bi-stable diverter. A monostable diverter may be characterized, for example, in that it returns automatically to an initial position when not pressurized by water pressure. In contrast, when pressurized by water pressure it is not possible or only possible with difficulty to switch over manually into the initial position.

A bi-stable diverter may be diverted both when unpressurized and when pressurized, wherein the respective switching position is maintained when pressurized and when not pressurized by water pressure.

Thus, it is particularly advantageous if the first diverter is a monostable diverter. The safety outlet may thus be placed at the initial or basic position of the diverter. In this manner, the safety outlet may always be initially selected such that it has to be switched over actively to the second diverter. After switching off the water, the first diverter always returns to the safety outlet. Thus, burns or unpleasant experiences may be reliably eliminated.

Preferably, the second diverter is a bi-stable diverter. In this manner, it is possible to change over between the two water outlets during operation, without the water having to be previously switched off.

In particular, the series consisting of the monostable diverter and the bi-stable diverter permits a testing of the water temperature at an uncritical point and a comfort function in which under load it is possible to switch back and forth between two outlets, for example a head spray and hand spray or the like, wherein a temperature remains preset.

A further advantage results from three outlets being able to be selected, wherein only one outlet is always activated. In this manner, it is possible to meet country-specific standards, for example of the USA.

In one embodiment, at least one water outlet of the second diverter is configured as a water dispensing device. This water dispensing device may be structurally connected, for example, to the diverter.

A water dispensing device may be, for example, a bath tub inlet, a head spray, a shower spray, a hand spray, a surge spray or a massage field.

In a further embodiment, both water outlets of the second diverter have a releasable interface for the fluidic connection to a water dispensing device. Two, also different, commercially available water dispensing devices may be connected in this manner to the sanitary arrangement and used.

In one embodiment, at least one releasable interface is arranged on a pipe or hose which is fluidically connected to the second diverter. In this manner, a flexible arrangement of the water dispensing device is possible. In this case, the pipe or the hose may be connected structurally or releasably to the diverter.

In one embodiment, the releasable interface has a screw connection or a plug connection for the fluidic connection. Such a screw connection may be, for example, a standardized screw connection, for example a G ½ screw connection.

A plug connection may be, for example, a pipe or hose plug connection.

In one embodiment, at least one of the two diverters has a push-push mechanism. In this manner a simple switchover is possible by pushing a button.

In one embodiment, a valve is fluidically connected upstream of the water inlet of the first diverter. The advantage here is that it is possible to change over between the water outlets without actuating the valve. This is important primarily when a temperature setting has been implemented by the valve, which would be lost by switching off.

In this case, it may be provided that the valve is switchable by a push-push mechanism. Thus, a simple capacity to switch on and off may be achieved in which, for example, a temperature setting, a mixing ratio and/or a flow rate may be left unchanged if a water flow is to be interrupted.

In one embodiment, the water inlet of the first diverter has a releasable interface for the fluidic connection to the valve. In this manner, a flexible arrangement of the valve and the diverter is possible.

The valve may be configured, for example, as a flow rate or temperature controller. In this case, it may also have a push mechanism.

BRIEF DESCRIPTION OF THE DRAWINGS

The invention is described in more detail hereinafter by means of exemplary embodiments with reference to the accompanying drawings, in which.

DETAILED DESCRIPTION

Figure 1:
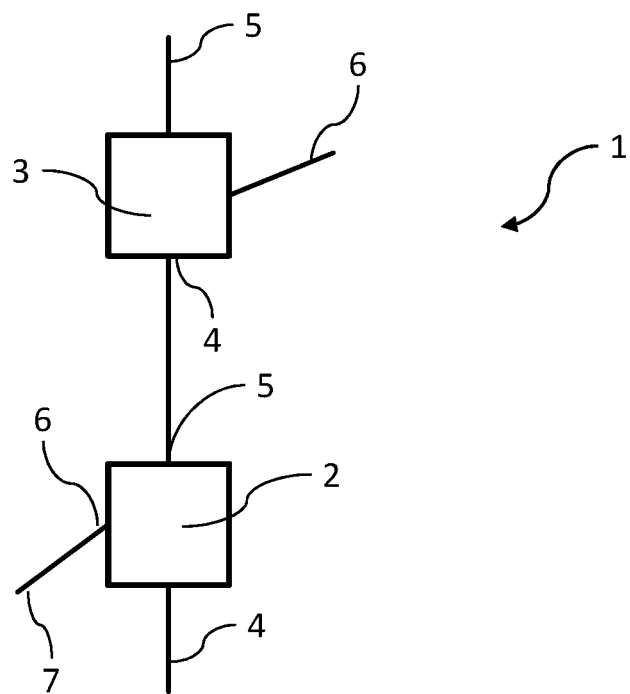
FIG. 1: shows a first sanitary arrangement.

FIG. 1 shows a first sanitary arrangement 1 according to the invention with a first diverter 2 and a second diverter 3.

The diverters 2 and 3 have in each case a water inlet 4, a first water outlet 5 and a second water outlet 6.

The first water outlet of the first diverter 2 is fluidically connected to the water inlet 4 of the second diverter 3. This may be implemented structurally in a fitting. In this case, however, it is also possible to produce a connection, a fluidic connection, via releasable interfaces.

The second diverter 3 has two water outlets 5, 6 which may be, for example, different shower heads or, as the case may be, water dispensing devices.

The second water outlet 6 of the first diverter 2 is configured as safety outlet 7. This safety outlet 7 may be, for example, a bath tub fitting, a toe tester or a shower head.

In the example, the safety outlet 7 is shown such that it is configured in one unit with the first diverter 2. To this end, for example, the first diverter 2 may be arranged, i.e. installed, directly in a bath tub fitting.

Alternatively, the first diverter 2 may also have a releasable interface for the fluidic connection of the safety outlets to a water dispensing device, wherein this water dispensing device then serves as a safety outlet.

The first diverter 2 is preferably a monostable diverter, wherein the second water outlet 6 represents the monostable switching position so that the safety outlet 7 is the basic position of the first diverter 2. In this manner, it is possible to avoid scalding or other unpleasant experiences as a result of heat.

The second diverter 3 is preferably a bi-stable diverter so that it is possible to change over between the different water outlets 5, 6 without interrupting the water.

Figure 2:
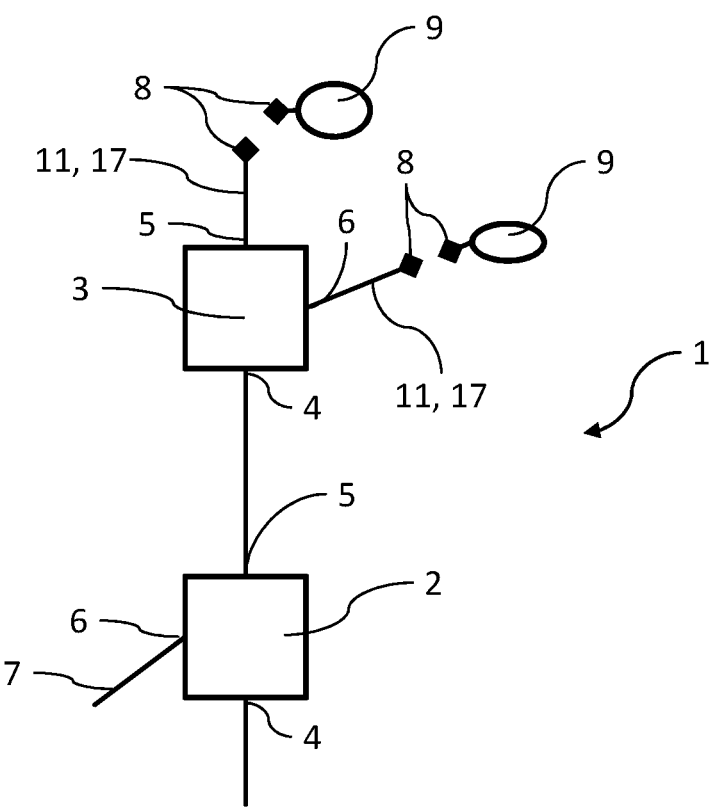
FIG. 2: shows a second sanitary arrangement with releasable interfaces.

FIG. 2 shows a further sanitary arrangement 1 which substantially corresponds to FIG. 1. The difference, however, is that the two water outlets 5, 6 in each case have a releasable interface 8 for the fluidic connection of a water dispensing device. Such an interface 8 may be any known or standardized interface. In this manner, any water dispensing devices 9 may be connected to the sanitary arrangement and used thereby. Thus, in particular, the end user may also exchange water dispensing devices 9 without complex interventions in the sanitary arrangement 1 being required. Accordingly, a water dispensing device 9 has a complementary interface 8.

Figure 4:
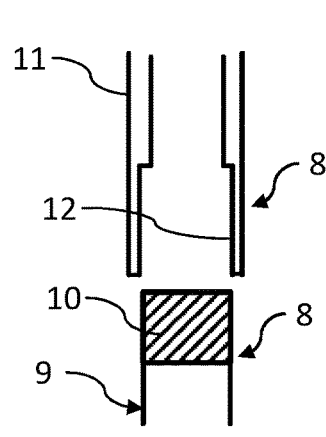
FIG. 4: shows a releasable interface with a screw connection.
Figure 5:
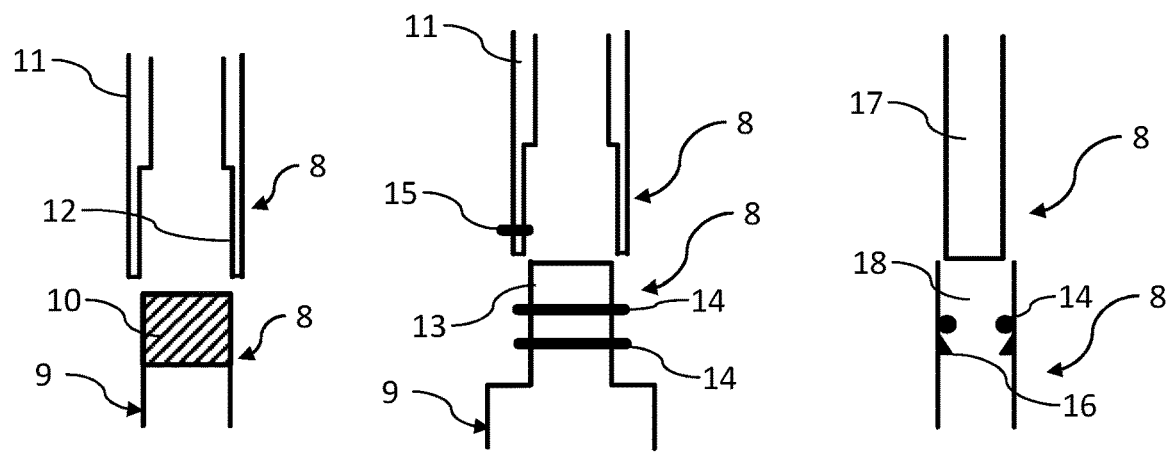
FIG. 5: shows a releasable interface with a pipe plug connection.
Figure 6:
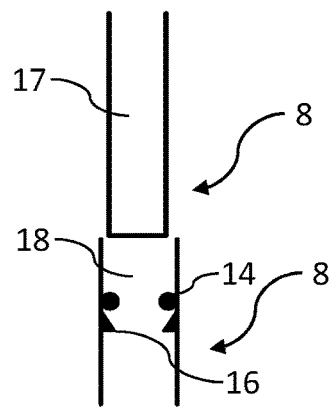
FIG. 6: shows a releasable interface with a hose plug connection.

FIGS. 4 to 6 show by way of example three different exemplary embodiments of such an interface 8.

A water dispensing device 9 which has an external thread 10 is shown schematically in FIG. 4. A pipe 11 with a suitable internal thread 12 is arranged on the side of the second diverter 3. The pipe 11 may be connected structurally or via a releasable fluidic interface to the second diverter 3.

In FIG. 5 the water dispensing device 9 has a plug-on region 13 which is configured as a pipe extension. In the plug-on region 13 two O-rings 14 are arranged spaced apart from one another. A pipe 11 may be plugged onto this plug-on region 13. For safety, the pipe 11 in the example has a fixing 15 which may be configured, for example, as a grub screw, the tip thereof being screwed into the plug-on region 13.

In FIG. 6 the water dispensing device 9 has an insertion region 18 which has an O-ring 14 and a retaining projection 16 on an inner circumference. A hose 17 may be introduced into this insertion region 18, wherein the retaining projection 16 engages into the preferably resilient hose 17 and thus prevents the hose 17 from being forced out of the insertion region 18.

In addition to the embodiments shown here, numerous other interfaces are known in the prior art. For example, a hose may be connected by a union nut with a thread. Additionally, further plug connections are known, which is why the application is not intended to be limited in any manner to the embodiments shown here.

Figure 3:
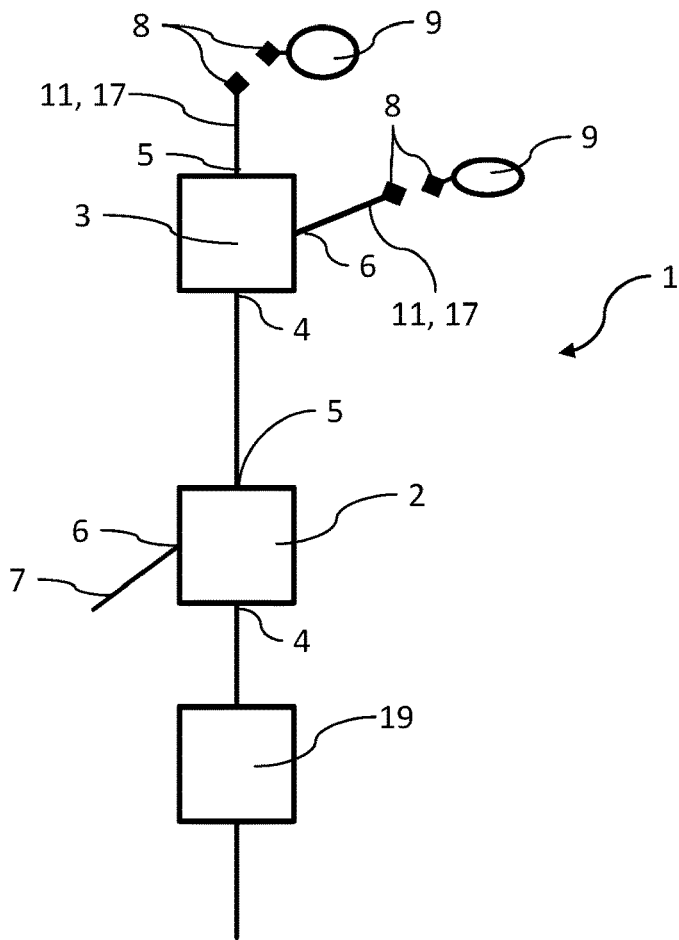
FIG. 3: shows a third sanitary arrangement with an additional valve.

FIG. 3 shows a further sanitary arrangement 1 which substantially corresponds to FIG. 2. In this sanitary arrangement, however, a valve 19 is fluidically connected upstream of the first diverter 2. This valve 19 may be a volumetric flow controller, a thermostat, or a different valve. The advantage here is that a volumetric flow and/or a temperature setting may be set irrespective of the setting of the water outlet. Accordingly, such a setting may also be obtained when changing over the different diverters. Instead of the one valve, a plurality of separate valves with different functions may also be connected upstream.

LIST OF REFERENCE NUMERALS

1 Sanitary arrangement
2 First diverter
3 Second diverter
4 Water inlet
5 First water outlet
6 Second water outlet
7 Safety outlet
8 Releasable interface
9 Water dispensing device
10 External thread
11 Pipe
12 Internal thread
13 Plug-on region
14 O-ring
15 Fixing
16 Retaining projection
17 Hose
18 Insertion region
19 Valve

The invention claimed is:

1. A sanitary arrangement (1), comprising:
at least two diverters (2, 3) comprising a first diverter (2) and a second diverter (3), each of the at least two diverters (2, 3) having a water inlet (4) and at least two water outlets (5, 6), wherein the first diverter (2) is a monostable diverter;
a first one of the water outlets (5) of the first diverter (2) is fluidically connected to the water inlet (4) of the second diverter (3); and at least one of the water outlets (5, 6) of the second diverter (3) has a releasable interface (8) configured for fluidic connection to a water dispensing device (9).

2. The sanitary arrangement (1) as claimed in claim 1, wherein a second one of the at least two water outlets (6) of the first diverter (2) is a safety outlet (7) or has a releasable interface configured for fluidic connection to a safety outlet (7).

3. The sanitary arrangement (1) as claimed in claim 2, wherein the safety outlet (7) is a bath tub outlet, a toe tester or a foot spray.

4. The sanitary arrangement (1) as claimed in claim 1, wherein at least one of the water outlets (5, 6) of the second diverter (3) is configured as a water dispensing device (9).

5. The sanitary arrangement (1) as claimed in claim 4, wherein the water dispensing device (9) is a bath tub inlet, a head spray, a shower spray, a hand spray, a surge spray or a massage field.

6. The sanitary arrangement (1) as claimed in claim 1, wherein both of the at least two water outlets (5, 6) of the second diverter (3) have a releasable interface (8) for the fluidic connection to a water dispensing device (9).

7. The sanitary arrangement (1) as claimed in claim 6, wherein the releasable interface (8) has a screw connection or a plug connection for the fluidic connection.

8. The sanitary arrangement (1) as claimed in claim 1, further comprising at least one releasable interface (8) arranged on a pipe (11) or hose (17) which is fluidically connected to the second diverter (3).

9. The sanitary arrangement (1) as claimed in claim 1, wherein at least one of the diverters (2, 3) comprises a monostable or bi-stable diverter.

10. The sanitary arrangement (1) as claimed in claim 1, wherein the first diverter (2) is a monostable diverter, and the monostable diverter in a base position switches to a safety outlet (7).

11. The sanitary arrangement (1) as claimed in claim 1, wherein a second one of the diverters (3) is a bi-stable diverter.

12. The sanitary arrangement (1) as claimed in claim 1, wherein at least one of the two diverters (2, 3) comprises a push-push mechanism.

13. The sanitary arrangement (1) as claimed in claim 1, further comprising a valve (19) fluidically connected upstream of the water inlet (4) of the first diverter (2).

14. The sanitary arrangement (1) as claimed in claim 13, wherein the water inlet (4) of the first diverter (2) has a releasable interface for the fluidic connection to the valve.

15. The sanitary arrangement (1) as claimed in claim 13, wherein the valve (19) is switchable by a push-push mechanism.

16. The sanitary arrangement (1) as claimed in claim 13, wherein the valve (19) is configured for at least one of a flow rate or temperature control.

\* \* \* \* \*